UNITED STATES PATENT OFFICE.

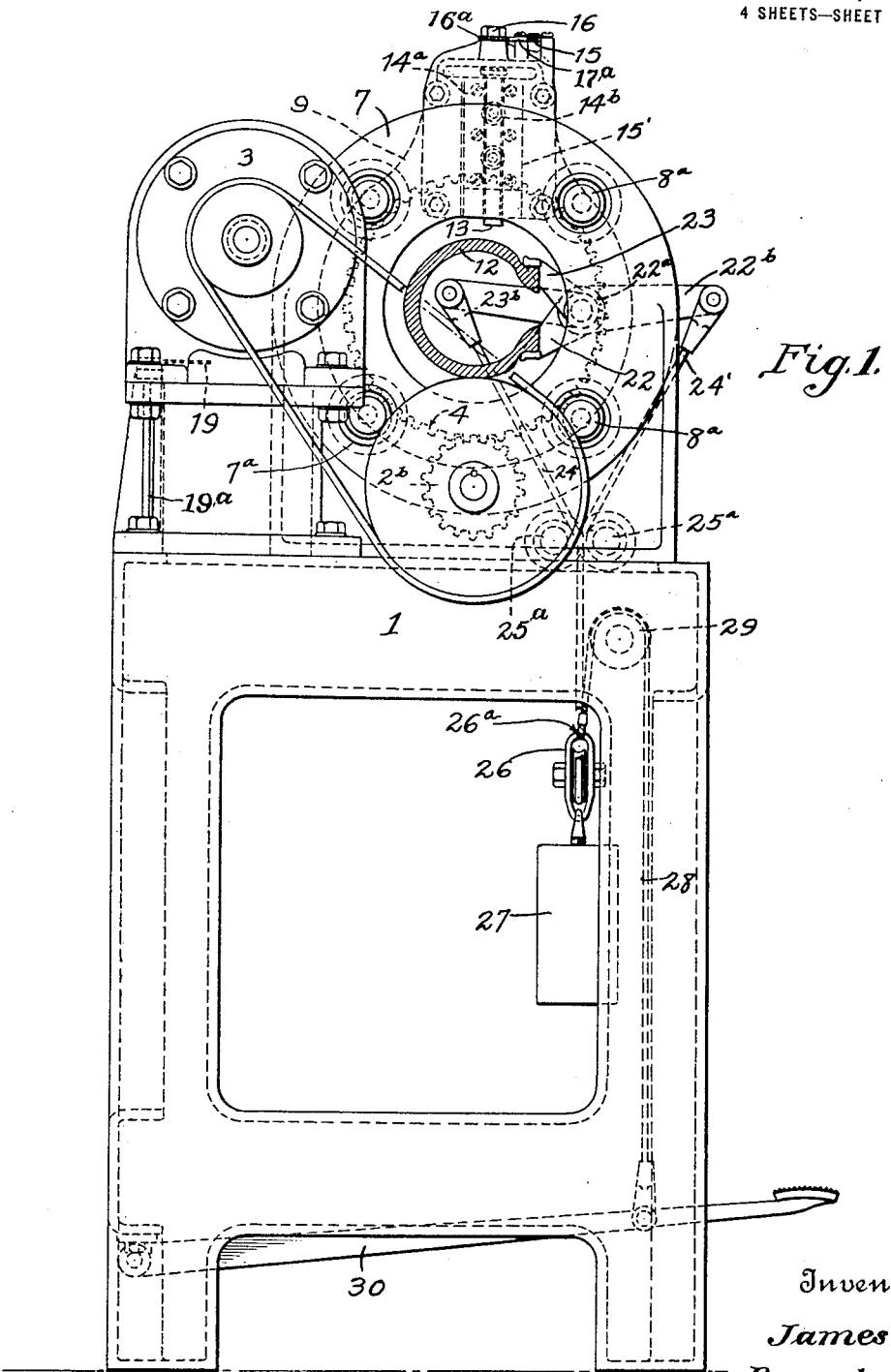

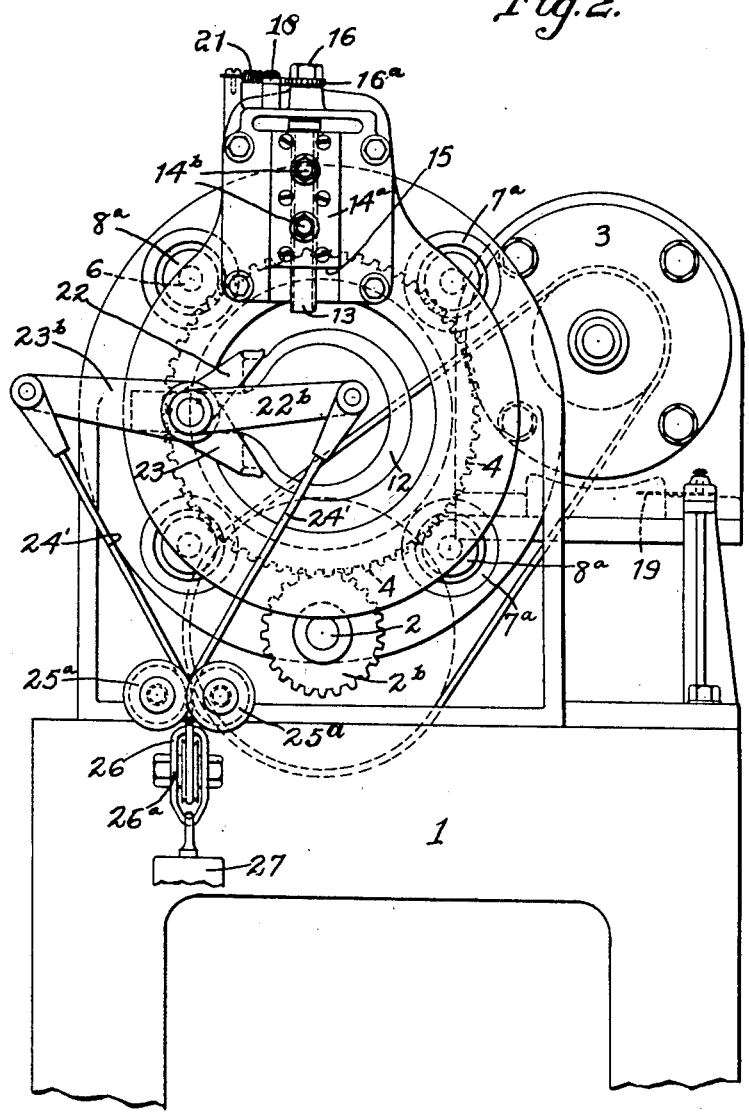

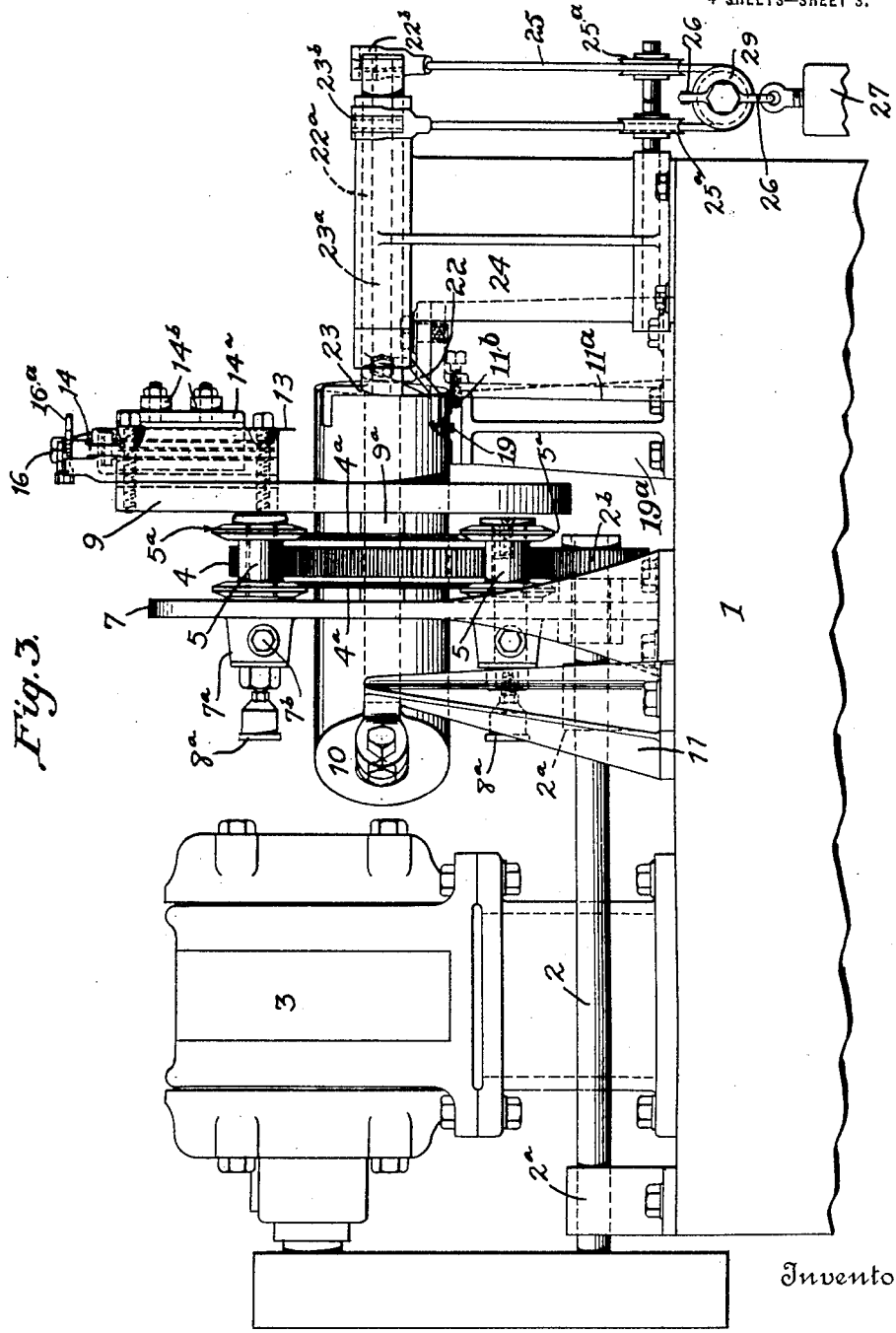

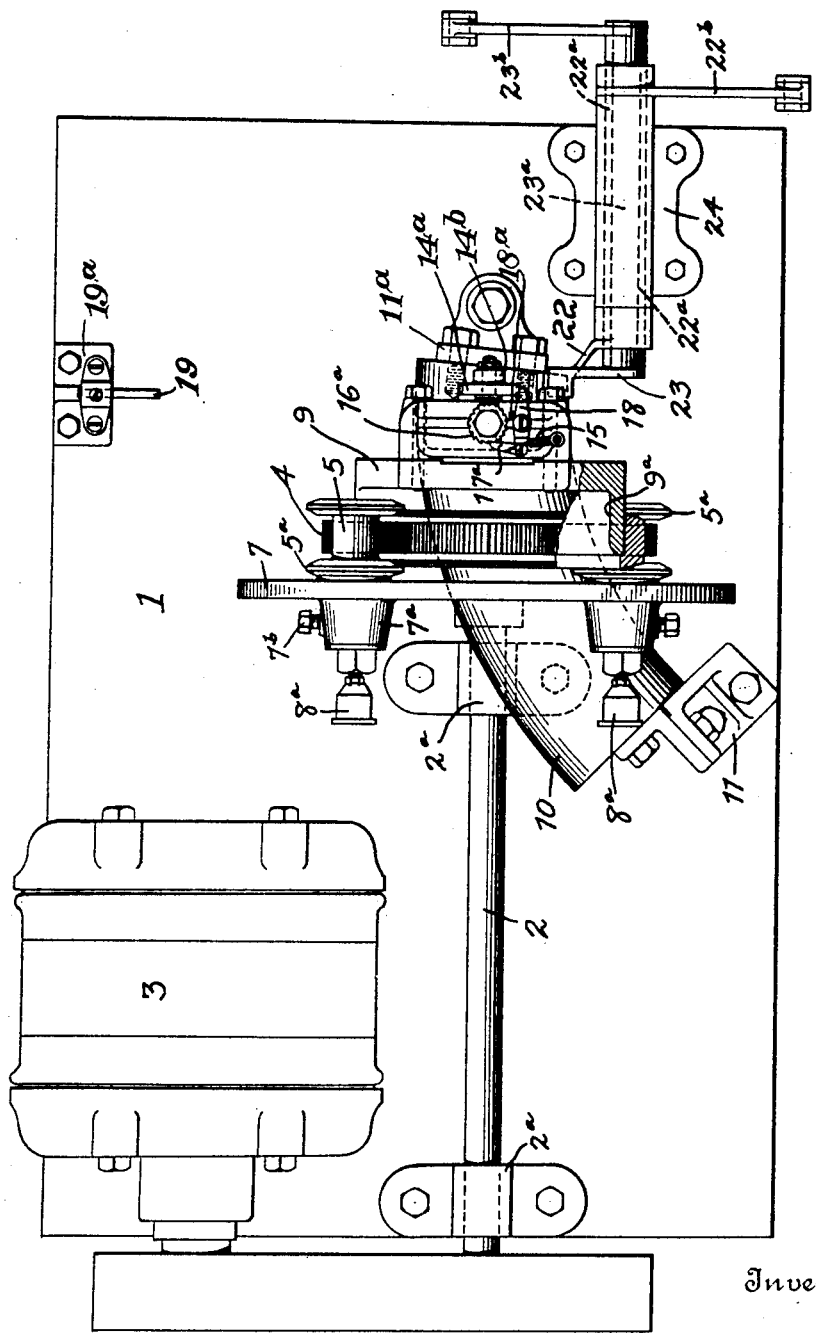

JAMES W. BRUNDAGE, OF AKRON, OHIO, ASSIGNOR TO THE MILLER RUBBER COMPANY, OF AKRON, OHIO, A CORPORATION OF OHIO.

MACHINE FOR CUTTING SECTIONS FROM TIRE-CASINGS.

1,398,123.

Specification of Letters Patent.  Patented Nov. 22, 1921.

Application filed August 12, 1920. Serial No. 402,980.

*To all whom it may concern:*

Be it known that I, JAMES W. BRUNDAGE, a citizen of the United States, and a resident of Akron, in the county of Summit and State of Ohio, have invented certain new and useful Improvements in Machines for Cutting Sections from Tire-Casings, of which the following is a specification.

My present invention relates to a machine for cutting or dividing tire shoes or casings into a plurality of sections to be used as samples and for similar purposes.

One object of the invention is to provide an apparatus by which smooth and regular cuts may be made whereby the complete tire may be divided into sections, all of which will be usable.

Another object is to provide a construction in which the tire will be held in its normal curved form during the cutting action, and any distortion of the same prevented.

A further object is to provide an arrangement which will eliminate the necessity of rag or fabric wrappings which have heretofore been commonly used to hold the tire upon the mandrel during the cutting, thereby saving the time and labor used in wrapping and the cost of the wrappings which are destroyed by the action of the cutting knife.

Still another object is to provide a machine with a tire supporting mandrel which will not be damaged by the action of the cutting knife, enabling the same mandrel to be used indefinitely.

With these and other objects in view the invention includes the novel features of construction and arrangement and combination of parts hereinafter described, the nature and scope of my said invention being defined by the appended claims.

An embodiment of the invention is illustrated in the accompanying drawings, in which:

Figure 1 is a side elevation of such a tire cutting machine, with the mandrel omitted for clearness of illustration.

Fig. 2 is an enlarged elevation (partly broken away) as viewed from the opposite direction from Fig. 1.

Fig. 3 is a view of the parts shown in Fig. 1 as viewed from the left of said figure, and Fig. 4 is a plan view, partly broken away.

Referring by reference characters to these drawings, the numeral 1 indicates a suitable supporting frame or table, above and upon which is journaled in suitable bearings $2^a$ $2^a$ a drive shaft 2, designed to be driven from any suitable source of power, such for example as the electric motor 3 connected to the shaft by belt and pulleys as shown.

The shaft 2 carries fast on the end thereof a spur gear or pinion $2^b$ which meshes with the external teeth of an annular rack or gear ring 4. This rack is rotatably carried by a plurality of equidistantly arranged spools or rollers 5, the gear ring being provided with beveled faces $4^a$ engaging the correspondingly beveled faces of the spool heads or flanges $5^a$.

The spools are journaled upon stub axles or shafts 6 rigidly secured to a substantially ring-shaped vertical frame 7 supported from the main frame or table 1. The frame is provided with opening to receive the stub shafts 6 and is preferably provided with bosses $7^a$ at the points where the openings are formed, thus affording better support for the axles without undue thickness of the frame, and the axles or shafts may be clamped in the openings by locking bolts $7^b$. Grease cups $8^a$ may be provided for lubricating the rollers through passages in the shafts in the manner well understood by those skilled in the art.

Secured to the gear ring 4 in any suitable manner as for example by means of arms or projections $9^a$ is a ring 9 which supports a cutting knife in the manner hereinafter described, this cutting knife, as it travels in a circular path, acting on the tire which is supported by a mandrel 10 secured to bracket arms 11 and $11^a$ bolted to the machine frame, the mandrel projecting through the ring frame as shown, with its axis or center in alinement with the axis of the ring frame. The tire is placed upon the mandrel and held thereby in the position indicated at 12.

The cutting knife is indicated at 13 and it is secured to a knife carrier 14 by suitable means such as a plate $14^a$ and bolts $14^b$.

The knife carrier is slidably guided in a guideway 15 formed in the ring frame or carried thereby, and means are provided for automatically moving the knife toward the axis of the ring frame to effect a progressive cutting action. This is preferably accomplished by providing a radially disposed operating screw 16 which has a threaded engagement with the knife carrier, the screw being rotatably carried by the guideway part and being provided at its upper end with a ratchet wheel $16^a$.

Coöperating with this ratchet wheel is a spring pressed pawl $17^a$ which is carried by one arm of a two armed lever 18, the other arm of which is designed to coöperate with a fixed contact member 19 carried by pedestal $19^a$ mounted on the main frame.

As the ring frame rotates the free arm of the lever 18 will contact, once on each complete rotation, with the contact member 19 and be rocked thereby, imparting a thrust to the pawl and turning the ratchet wheel and likewise the screw to feed the knife toward the axis of rotation. A fixed stop $18^a$ determines the limit of movement of the lever 18 in one direction and a spring 21 holds it yieldingly in contact with said stop.

The spring may conveniently be a coiled spring having one end connected to the guideway part and the other end connected to the pawl inside of the pivot so that one and the same spring tends to rock the lever 18 and keep the pawl pressed toward and into engagement with the teeth of the ratchet wheel.

In the use of the device a tire casing is severed at one part to enable the portion adjacent the cut to be slipped upon the mandrel 12 which is of arcuate shape to conform both in cross section and longitudinal curvature to the inside of the tire. For holding the tire firmly against displacement on the mandrel during the cutting operation a pair of clamping arms 22 and 23 are provided designed to embrace opposite edges of the tire casing or shoe as shown in Fig. 2.

One of these arms 23 is mounted on a solid or inner shaft $23^a$, the other arm 22 being mounted on a tubular shaft $22^a$ which surrounds shaft $23^a$ and which is journaled in a supporting bracket 24 carried by the main table or frame.

The shafts $22^a$ and $23^a$ carry at the opposite end arms $22^b$ and $23^b$ respectively to which are connected suitable means for actuating the gripping arms to cause them to grip and release the edges of the tire as desired.

My preferred means for so actuating the arms comprises a cable or flexible element 25, having its ends connected to the extremities of the arms $22^b$ and $23^b$, and its intermediate portion passed down over or between guide pulleys $25^a$, $25^a$ journaled on fixed axes, the loop of the cable being passed around a pulley or sheave 26 from which is suspended a weight 27. The weight tends to move the gripping arms in position to press the edges of the tire toward each other and hold the tire against displacement during the cutting operation and the cable compensates for any inequalities in the edges of the tire due to position or thickness so that grippers will act with equal pressure.

To release the pressure on the gripping arms to enable the tire to be removed I preferably provide a cable 28 (Fig. 1) which has one end attached to the frame $26^a$ of sheave 26, said cable passing over a pulley 29 journaled on a fixed axis and connected at its lower end to a treadle lever 30.

The last or mandrel may be constructed of wood or any other material which will not injure the knife, or may be made of metal if provided with a circumferential groove to receive the knife blade and deep enough to prevent contact of the edge of the blade with the bottom of the groove. If wood or other relatively soft material is used it will last indefinitely as the blade acts always in the same position relative to the last.

After a section has been severed from the tire, the grippers are released, the section removed, and the tire slid forward on the last to bring a fresh portion into proper position whereafter the grippers are again brought into action, the knife in the interim having been returned to its outward position preparatory to the repetition of the cutting action which return may be effected by disengaging the pawl and rotating the ratchet wheel in the reverse direction by hand.

It will be understood that the tire is slipped onto the mandrel from the inner or left hand end Figs. 3 and 4, the narrow horizontal portion of the left hand bracket 11 lying in the open belly of the tire. The right hand bracket $11^a$ serves as a stop to limit the movement of the tire on the mandrel and the adjustment screw $11^b$ is provided to determine the length of section to be cut therefrom.

Having thus described my invention what I claim is—

1. A machine for cutting sections from pneumatic tire casings comprising an arcuate last or mandrel adapted to support a tire, cutter means adapted to travel circumferentially around the same, and gripper means for engaging the edges of the tire.

2. A machine for cutting sections from pneumatic tire casings comprising an arc shaped last or mandrel means supporting the ends of said mandrel, one of said supporting means constituting a stop or gage cutter means for traveling circumferentially around said mandrel, and gripper means for engaging the edges of the tire.

3. A machine for cutting sections from pneumatic tire casings comprising an arc shaped last or mandrel having a portion to receive a tire, a cutter arranged to travel circumferentially around the mandrel, means for gripping the edges of the tire to hold the same on the mandrel, and means for feeding the cutter toward the mandrel.

4. A machine for cutting sections from pneumatic tire casings comprising an arc shaped mandrel having a portion to receive a portion of the tire, a cutter rotatable about said mandrel, a pair of grippers for engaging the edges of the tire, means for applying yielding pressure to said grippers, and means for releasing said pressure at will.

5. A machine for cutting sections from pneumatic tire casings comprising a frame having an open center, means for rotatably supporting and driving said frame, a last having a portion disposed in said open center, and adapted to hold a tire, means for gripping the tire on the mandrel, and a radially movable cutter carried by said frame.

6. A machine for cutting sections from pneumatic tire casings comprising a gear ring, a plurality of spaced rollers rotatably supporting said ring, a driving gear engaging said ring gear, a frame connected with said ring gear and having an open center, a last or mandrel projecting through said ring gear and frame, means for holding the tire on the last, and a radially movable knife carried by said frame.

7. A machine for cutting sections from pneumatic tire casings comprising a frame having an open center, means for supporting and driving said frame, a last disposed in said open center and adapted to receive a tire, cutting means carried by said frame, and means for automatically moving said cutting means toward the last as the frame rotates.

8. A machine for cutting sections from pneumatic tire casings comprising a frame having an open center, means for supporting and driving said frame, means for holding a tire centrally of said frame, cutting means carried by said frame, and means for moving said cutting means progressively toward the tire as the frame rotates.

9. A machine of the character described comprising a stationary unitary ring frame, a plurality of spool shaped rollers carried thereby, a ring gear having beveled walls engaging the flanged heads of said spool shaped rollers, a driving pinion engaging said ring gear, a cutter carrying frame carried by said ring gear and having an open center, means projecting axially through said open center for holding a tire, and radially movable cutter mechanism carried by said cutter carrying frame.

10. A machine for cutting sections from pneumatic tire casings comprising a stationary unitary ring frame, a plurality of spool shaped rollers carried thereby, a ring gear having beveled walls engaging the flanged heads of said spool shaped rollers, a driving pinion engaging said ring gear, a radially movable cutter supported from said ring gear, and means located centrally of said ring gear and extending into the plane of the cutter for supporting a tire directly in line with the cutting edge of the cutter.

11. A machine for cutting sections from pneumatic tire casings comprising a rotary cutter carrying frame having an open center, means for supporting and driving said frame, a last located within said cutter carrying frame, means for holding a tire on said last, a radial guideway carried by said frame, a tool slide carried by said guideway, actuating means for moving said tool slide, and a fixed stop adapted to be engaged by said actuating means on the rotation of the frame for moving said tool slide.

12. A machine for cutting sections from pneumatic tire casings comprising a rotary cutter carrying frame having an open center, means for supporting and driving said frame, a last located within said cutter carrying frame, means for holding a tire on said last, a radial guideway carried by said frame, a tool slide carried by said guideway, screw means for actuating said tool slide, pawl and ratchet mechanism for actuating said screw means, and a fixed stop for operating said pawl and ratchet means.

13. A machine for cutting sections from tire casings comprising an arcuate last shaped to conform to the inside of a tire, a pair of gripper arms pivoted upon a common axis and adapted to embrace opposite edges of the tire, means for simultaneously actuating said arms, and cutter means arranged to move circumferentially about said last.

14. A machine for cutting sections from tire casings comprising a last to receive a tire, cutter means arranged to move circumferentially about said last, a pair of independently pivoted grippers adapted to engage opposite edges of the tire, and a single operating means connected to both said grippers by compensating connections.

15. A machine of the character described comprising a last to receive a tire, cutter means arranged to move circumferentially about the last, a pair of grippers adapted to engage opposite edges of the tire, independent shafts to which said grippers are secured, arms on the ends of said shafts, a flexible cable having its ends connected to the ends of said arms, a pulley engaging the intermediate portion of said cable, means for applying tension to said pulley, and means for manually relieving said tension.

16. A machine for cutting sections from tire casings comprising an arcuate last disposed to hold a tire in horizontal position, a pair of opposed gripper members disposed adjacent the inner edge of the last and movable toward each other to engage the beaded edges of the tire and stretch the tire about the last, means for moving said gripper members toward and from each other and cutter means for severing the tire.

In testimony whereof I affix my signature.

JAMES W. BRUNDAGE.